United States Patent [19]
Fischer et al.

[11] Patent Number: 5,165,821
[45] Date of Patent: Nov. 24, 1992

[54] OIL-SORBING BOOM

[75] Inventors: Edward M. Fischer, White Bear Lake; Stanley P. Cernohous, Dellwood, both of Minn.; Alan A. Allen, Woodinville, Wash.

[73] Assignee: Minnesota Mining and Manufacturing Co., St. Paul, Minn.

[21] Appl. No.: 748,045

[22] Filed: Aug. 21, 1991

[51] Int. Cl.⁵ .............................................. E02B 15/06
[52] U.S. Cl. ................................... 405/63; 210/242.4; 210/924; 405/72
[58] Field of Search ..................... 405/60, 63, 66, 72; 210/242.4, 922, 923, 924

[56] References Cited

U.S. PATENT DOCUMENTS

| | | |
|---|---|---|
| 3,537,587 | 11/1970 | Kain . |
| 3,539,013 | 11/1970 | Smith ............................. 405/72 X |
| 3,584,462 | 6/1971 | Gadd . |
| 3,667,235 | 6/1972 | Preus et al. . |
| 3,667,608 | 6/1972 | Burroughs et al. . |
| 3,679,058 | 7/1972 | Smith . |
| 3,702,657 | 11/1972 | Cunningham et al. . |
| 3,710,943 | 1/1973 | Davidson et al. . |
| 3,764,527 | 10/1973 | Sohl . |
| 3,779,382 | 12/1973 | Steltner . |
| 3,783,621 | 1/1974 | Preus et al. . |
| 3,810,832 | 5/1974 | Rhodes . |
| 3,852,965 | 12/1974 | Rudd ................................. 405/72 |
| 4,052,306 | 10/1977 | Schwartz et al. . |
| 4,065,923 | 1/1978 | Preus ................................. 405/72 X |
| 4,619,553 | 10/1986 | Fischer .............................. 405/63 |
| 4,923,332 | 5/1990 | Sanocki et al. ..................... 405/63 |

FOREIGN PATENT DOCUMENTS 2482991 11/1981 France ................................. 405/63

OTHER PUBLICATIONS

3M, "3M Brand Oil Sorbent".
3M, 1990, "Powersorb Products Are Your Best Defense Against Hazardous Spills".
Conwed Plastics, 1987, "Thermoplastic Webs".

Primary Examiner—David H. Corbin
Attorney, Agent, or Firm—Merchant, Gould, Smith, Edell, Welter & Schmidt

[57] ABSTRACT

A combined skirted oil-sorbing boom and oil-sorbing sweep has a buoyant inner core and an oil-sorbent outer core of a spirally wound sheet of polymeric, oleophilic, hydrophobic microfibers. Adhesively bonded to a sheet of the microfibers at the outer face of the outer core is an open-mesh netting of polymeric monofilaments that are fused at their crossings. The netting and the sheet to which it is adhered extend from the outer core to form a depending skirt which acts as a barrier to oil that is being sorbed by the microfibers. The buoyant inner core can be an open-cell foam that sorbs oil slowly, thus supplementing the oil-sorbing capability without significant loss of freeboard.

12 Claims, 1 Drawing Sheet

OIL-SORBING BOOM

BACKGROUND OF THE INVENTION

1. Field of the Invention

The invention concerns oil booms that serve as barriers to oil spills and also concerns oil-sorbing sweeps that sorb small quantities of oil from the surface of a body of water. More specifically, the invention concerns the need for a boom that can serve as a barrier to floating oil and can also sorb that oil.

2. Description of the Related Art

An effective technique for the disposal of offshore oil spills is to confine the oil within a floating boom and then remove the confined oil either by pumping or by burn-off. Such a boom is disclosed in coassigned U.S. Pat. No. 4,923,332 (Sanocki et al.) and is currently marketed by 3M Co. as "3M Fire Boom" in 50-foot (15.2-m) lengths. Another fire-resistant boom is disclosed in coassigned U.S. Pat. No. 4,619,553 (Fischer).

Such barrier-type booms are used for disposing of oil spills but are not effective for clearing oil sheen or otherwise keeping water substantially free from oil contamination. Commonly used for that purpose are oil-sorbing sweeps and booms that do not provide barriers to the oil. A typical oil-sorbing sweep consists of a wide oil-sorbing web and a rope sewn along a margin of the web, e.g., the T-126 sweep from 3M Co. Such a sweep can be used in conjunction with a barrier-type boom by being placed downstream from the boom to remove any escaping traces of oil, e.g., to help to keep oil from entering a desalinization plant.

Another oil-sorbing sweep is disclosed in coassigned U.S. Pat. No. 4,052,306 (Schwartz et al.). Its oil-sorbent member preferably is an elongated web of blown microfibers such as polypropylene microfibers reinforced by folding and sewing each of its edges around a rope. Attached to hang freely beneath the floating web is an open-mesh netting that generally is formed from a network of filaments that may be woven, knitted, or fused at their crossing points. The netting can form a "tube" or closed cylinder around the web.

Known oil-sorbing sweeps submerge after becoming saturated with oil, and this causes them to release part of the sorbed oil.

Some oil-sorbing sweeps are called "booms" because they look like the oil-barrier booms even though they are not effective as barriers Typical oil-sorbing booms employ open-mesh bags that are stuffed with oil-sorbing material, e.g., the T-270 and T-280 oil-sorbing boom from 3M Co. Each has an elongated nylon open-mesh bag that is stuffed with oil-sorbent polypropylene blown microfibers. A number of such bags are linked together have the appearance of a chain of sausages.

U.S. Pat. No. 3,679,058 (Smith) shows a sausage-like oil-sorbing sweep (there called a "boom") that is similar to the 3M T-270 and T-280 oil-sorbing booms, but rectangular in shape. It contains "lightweight bats of polymer fibers or blown polymer film of such materials as polypropylene which present enormous fiber surface area on which oil film deposits itself" that are enclosed in a greatly elongated tubular net sleeve that is preferably formed of "lightweight polymer fibers which may be heat-sealed in net configuration or which may be woven or knotted like a fisherman's net" (col. 2, lines 10–40).

In U.S. Pat. No. 3,702,657 (Cunningham et al.), water is allowed to flow through box-shaped cages that are filled with oil-sorbent bags or pads to facilitate disposal of oil on bodies of water and to prevent contamination of shorelines.

SUMMARY OF THE INVENTION

The invention provides an oil-sorbing boom that should sorb oil as effectively as does do the 3M T-270 and T-280 booms while also serving as an oil barrier. Even though it can perform both functions, the novel oil-sorbing boom should be only slightly more expensive than present oil-sorbing sweeps that are not barriers. Furthermore, the novel oil-sorbing boom can be made to sorb large quantities of oil without significant freeboard loss.

Briefly, the oil-sorbing boom of the invention comprises a highly oil-sorbent tubular outer core of oleophilic, hydrophobic microfibers;

a flexible buoyant inner core that can be oil-sorbent but is substantially less sorbent of oil than the outer core;

a sleeve surrounding the outer core and comprising a strong, abrasion-resistant, open-mesh netting of strands or monofilaments that are fused or mechanically interlocked at their crossing points; and a depending skirt that is a barrier to oil and preferably is oil-sorbent.

The novel oil-sorbing boom should be sufficiently flexible for its tubular outer core to track the surface of rough water, thus always keeping its skirt in position as a barrier to oil and so preventing oil from bypassing the boom.

A preferred inner core preferably is formed of a sheet of polymeric foam, more preferably an olefin polymer such as polypropylene, which sheet is spirally wound upon itself to form the inner core. The foam preferably is open-cell to sorb oil relatively slowly. By doing so, the inner core can supplement the oil-sorbent capability of the outer core while affording sufficient buoyancy to maintain a desirable freeboard after the outer core has become saturated with oil. Instead of being a spirally wound sheet, the foam can be one or more logs.

The microfibers of the outer core of the novel oil-sorbing boom preferably are blown polymeric microfibers, more preferably of a polyolefin such as polypropylene which has great oil sorbency and is inexpensive. Useful blown microfibers have a diameter of from 0.5 to 10 $\mu m$ and are disclosed in U.S. Pat. No. 3,764,527 (Sohl). For economy of construction, the microfibers preferably form a sheet that is spirally wound on the inner core.

The sleeve of the novel oil-sorbing boom preferably is formed by adhesively bonding an open-mesh netting to a sheet of microfibers that can be identical to a sheet that is used to form the outer core. After the spirally wound sheet of microfibers has been inserted into the sleeve, the sheet of the sleeve should snugly enclose the outermost convolution of the spirally wound outer core and so can form part of the outer core. Preferably an extension of the adhesively laminated netting and sheet forms the depending skirt of the novel oil-sorbing boom.

Particularly preferred as the open-mesh netting of the sleeve are oriented polymeric monofilaments that are strong and highly resistant to abrasion so that the boom can be towed through the water and dragged across the deck and gunwale of a ship without breaking the monofilaments, even when the boom is loaded with oil. The monofilaments should also be resistant to oil and to salt water. Monofilaments possessing such properties can be made of a polyolefin such as polypropylene. Oriented polyolefin monofilaments can be fused at their crossing points and can have sufficient flexibility to be interlocked mechanically at their crossing points by a leno weave, but forming a leno weave is much more expensive than simply fusing filaments at crossing points. A porous rip-stop nylon fabric can be sewn onto the netting to enhance its abrasion-resistance.

Open-mesh nettings of oriented polypropylene monofilaments that are fused at their crossing points are available from Conwed Plastics, Minneapolis, MN. An 8-page Conwed brochure entitled "Thermoplastic Webs" and dated 1987 illustrates (on the second page) apparatus for extruding such netting and (on the third page) apparatus for orienting the monofilaments of the extruded netting. Such nettings that are preferred for use in the present invention have oriented polypropylene monofilaments of from 0.2 to 0.4 mm in diameter and from 1 to 2 monofilaments/cm in each direction.

The materials of the external netting, the outer core, the inner core, the skirt, and the adhesive by which the netting is adhesively bonded to the exterior face of the outer core preferably are thermoplastic polymers and so can be recycled after the novel boom has been used to pick up oil. Preferably, the same thermoplastic polymer such as a polyolefin is used for each in order to simplify recovery in the recycling process. A preferred polyolefin for this purpose is polypropylene that can be used by itself for each of the external netting, outer core, inner core, and the adhesive. When used as the adhesive, a polypropylene melt can be coated onto a netting of oriented polypropylene filaments without damage to the filaments.

BRIEF DESCRIPTION OF THE DRAWING

The invention may be more easily understood in reference to the drawing, the single figure of which is a cross section through an oil-sorbing boom of the invention.

DESCRIPTION OF THE PREFERRED EMBODIMENTS

Figure 1:
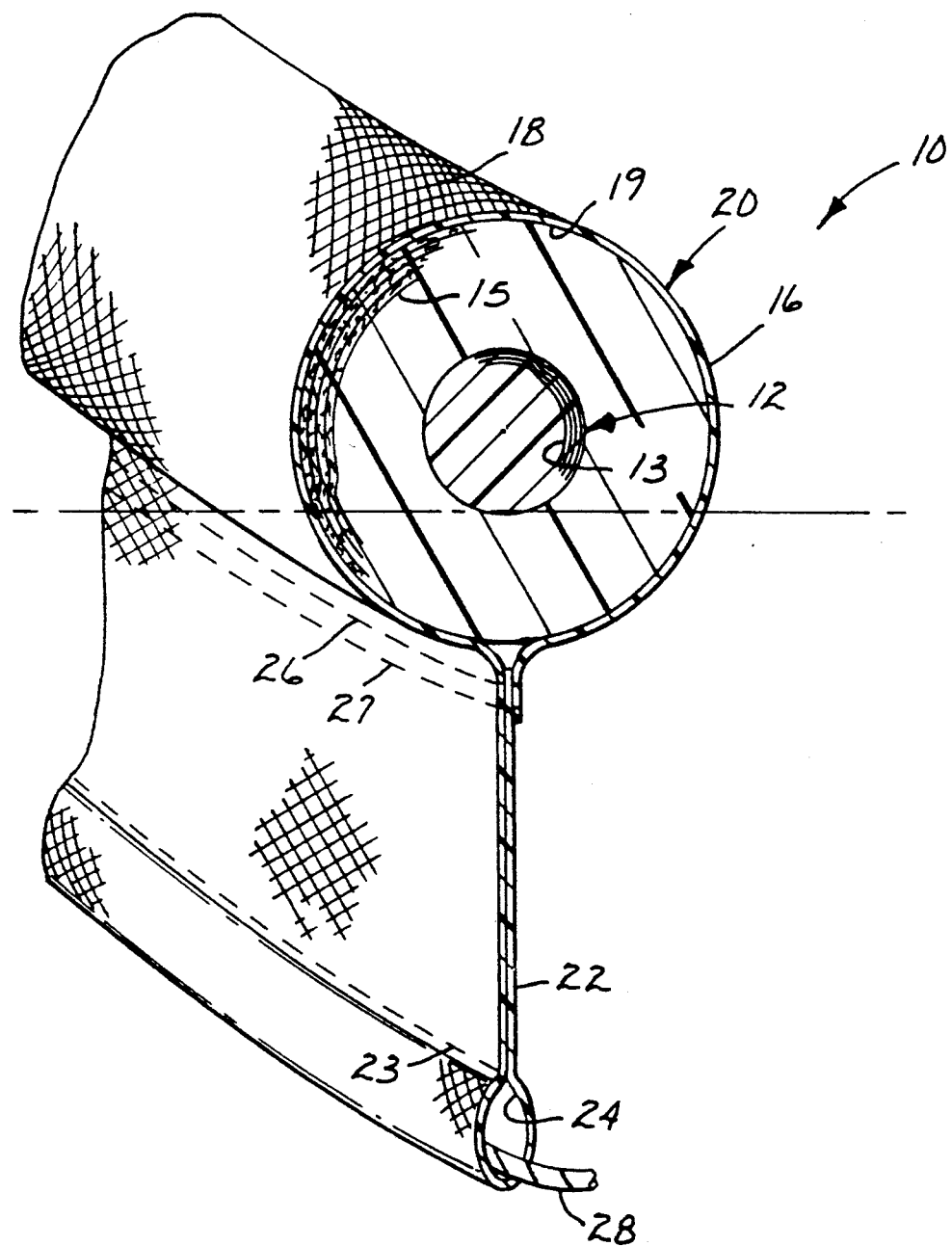

In the drawing, an oil-sorbing boom 10 has a flexible buoyant inner core 12 formed by spirally winding a sheet 13 of polymeric foam upon itself. Onto the inner core has been spirally wound a first sheet 15 of polymeric, oleophilic, hydrophobic microfibers. A sleeve 16 has been formed from a laminate made by adhesively bonding an open-mesh netting 18 of oriented polymeric monofilaments to a second sheet 19 of microfibers that can be identical to the first sheet 15. The inner core 12 and spirally wound sheet 15 have been inserted into the sleeve 16. The spirally wound first sheet 15, together with the second sheet 19, provide an outer core 20. The laminate of the second sheet 19 and adhered netting 18 extends from the outer core and is doubled back upon itself to form a skirt 22 that is sewn at a seam 23 to form a pocket 24 and at seams 26 and 27 adjacent the outer core 20. In use, a rope or chain 28 is fed through the pocket 24, and the boom can be held down by attaching weights (not shown).

EXAMPLE

A prototype oil-sorbing boom as illustrated in the drawing has been constructed to have:

inner core 12: 1-mm sheet of open-cell polypropylene foam, 8.9 kg/m$^3$ in density, spirally wound to a diameter of 9.5 cm sheets 15 and 19: 6-mm sheet of polypropylene blown microfibers netting 18: oriented polypropylene monofilaments, 1.6 strands/cm in each direction (OE 2015 netting from Conwed)

outer core 20: 20.3 cm in diameter skirt 22: 20.3 cm in height adhesive: heat-activatable ethyl vinyl acetate seams 23,26,27: UV-stabilized nylon thread, 2 stitches/cm, type 301 lock stitch

TESTING

The prototype was employed as a barrier in a water tank, into one side of which was poured crude oil to a depth of about 2.5 cm. Examination the next day showed no oil on the water at the clean side of the tank.

Dissection of the phototype showed that oil initially saturated the side of the outer core adjacent the oil at the water line and then penetrated upwardly. The adjacent portion of the outer wrap of the foam of the inner core also was saturated, and successive wraps of the foam had progressively taken up less oil, with the central wraps being clean. From this, it was deduced that the inner core acts as a barrier tending to keep sorbed oil from migrating to the surface of the outer core at the clean side of the boom, thus helping to keep the water clean at the clean side.

We claim:

1. An oil-sorbing boom comprising:
  (a) a tubular member having an inner core of polyolefin material and outer tubular construction positioned around said inner core:
    (i) said outer tubular construction comprising a highly oil-sorbent construction of oleophilic, hydrophobic microfibers;
    (ii) said inner core of polyolefin material comprising a flexible construction which is sorbent of oil but less sorbent of oil than the outer tubular construction and which is sufficiently buoyant to maintain buoyancy of said oil-sorbing boom in water when the outer tubular construction is saturated with oil;
  (b) a sleeve surrounding said tubular member; said sleeve comprising an abrasion-resistant, open-mesh netting of strands that are attached to one another at their crossing points; and,
  (c) an oil-barrier skirt positioned to depend from said tubular member.

2. An oil-sorbing boom according to claim 1 wherein each of said outer core, sleeve and skirt comprise polyolefin material.

3. An oil-sorbing boom according to claim 1 wherein said skirt comprises an oil-sorbent skirt.

4. An oil-sorbing boom according to claim 1 wherein:
  (a) said inner core comprises a polyolefin foam.

5. An oil-sorbing boom according to claim 4 wherein:
  (a) said inner core comprises a spirally wound sheet of polyolefin foam.

6. An oil-sorbing boom according to claim 1 wherein:
  (a) said outer tubular construction comprises a spirally wound sheet of polymeric microfibers.

7. An oil-sorbing boom according to claim 6 wherein:
  (a) said outer tubular construction comprises blown polyolefinic microfibers.

8. An oil-sorbing boom according to claim 6 including:
(a) a second sheet of polymeric microfibers surrounding said outer tubular construction; and
(b) wherein said sleeve is adhesively bonded to said second sheet of polymeric microfibers.

9. An oil-sorbing boom according to claim 8 wherein:
(a) said sleeve and said second sheet comprise a laminate.

10. An oil-sorbing boom according to claim 1 wherein said open-mesh netting comprises oriented polymeric monofilaments.

11. An oil-sorbing boom according to claim 10 wherein:
(a) said sleeve includes rip-stop fabric attached to said open-mesh netting.

12. An oil-sorbing boom according to claim 11 wherein said monofilament comprises polypropylene monofilament of from 0.2 to 0.4 mm in diameter that are spaced from 1 to 2 monofilaments per cm in each direction.

* * * * *